US009471297B2

(12) United States Patent
Hogan et al.

(10) Patent No.: US 9,471,297 B2
(45) Date of Patent: Oct. 18, 2016

(54) METHODS AND APPARATUS FOR UNINSTALLING A SOFTWARE APPLICATION

(71) Applicant: kCura LLC, Chicago, IL (US)

(72) Inventors: Christopher Hogan, Lombard, IL (US); Nicolas P. Kapuza, Chicago, IL (US); Michael P. Masanek, Skokie, IL (US); Konrad Makowski, Harwood Heights, IL (US)

(73) Assignee: KCURA LLC, Chicago, IL (US)

( * ) Notice: Subject to any disclaimer, the term of this patent is extended or adjusted under 35 U.S.C. 154(b) by 0 days.

(21) Appl. No.: 14/482,831

(22) Filed: Sep. 10, 2014

(65) Prior Publication Data
US 2016/0070553 A1    Mar. 10, 2016

(51) Int. Cl.
*G06F 9/445* (2006.01)
*G06F 17/30* (2006.01)

(52) U.S. Cl.
CPC ........... *G06F 8/62* (2013.01); *G06F 17/30477* (2013.01)

(58) Field of Classification Search
CPC ....... G06F 8/61; G06F 8/62; G06F 17/30477
USPC .................................. 717/168–178; 707/769
See application file for complete search history.

(56) References Cited

U.S. PATENT DOCUMENTS

| | | | | |
|---|---|---|---|---|
| 5,933,647 | A * | 8/1999 | Aronberg | G06F 8/61 717/178 |
| 6,442,754 | B1 * | 8/2002 | Curtis | G06F 8/61 707/999.104 |
| 6,687,902 | B1 * | 2/2004 | Curtis | G06F 8/62 717/174 |
| 6,910,208 | B1 * | 6/2005 | Zimniewicz | G06F 9/4446 715/762 |
| 2004/0064458 | A1 * | 4/2004 | Hagarty | G06F 17/3056 |
| 2005/0289513 | A1 * | 12/2005 | Chen | G06F 8/62 717/121 |
| 2008/0270444 | A1 * | 10/2008 | Brodie | G06F 3/0482 707/999.102 |
| 2011/0202915 | A1 * | 8/2011 | Kuroyanagi | G06F 8/61 717/178 |

* cited by examiner

*Primary Examiner* — James D Rutten
(74) *Attorney, Agent, or Firm* — Marshall, Gerstein & Borun LLP; Randall G. Rueth

(57) ABSTRACT

Methods and apparatus for uninstalling an application are disclosed. When a user selects an application to be uninstalled, a database is queried to determine a plurality of software objects that are associated with the selected application. The system then displays a plurality of relationships between the plurality of software objects (e.g., a tree view with check boxes to select and unselect objects). The display indicates which software objects in the plurality of software objects can be deleted without affecting other software objects in the plurality of software objects. In addition, the display indicates which software objects in the plurality of software objects cannot be deleted without affecting other software objects in the plurality of software objects. Based on these results, the user then determines a new list of objects to keep and objects to delete. This process is repeated until the user approves the list and deletes the application.

20 Claims, 7 Drawing Sheets

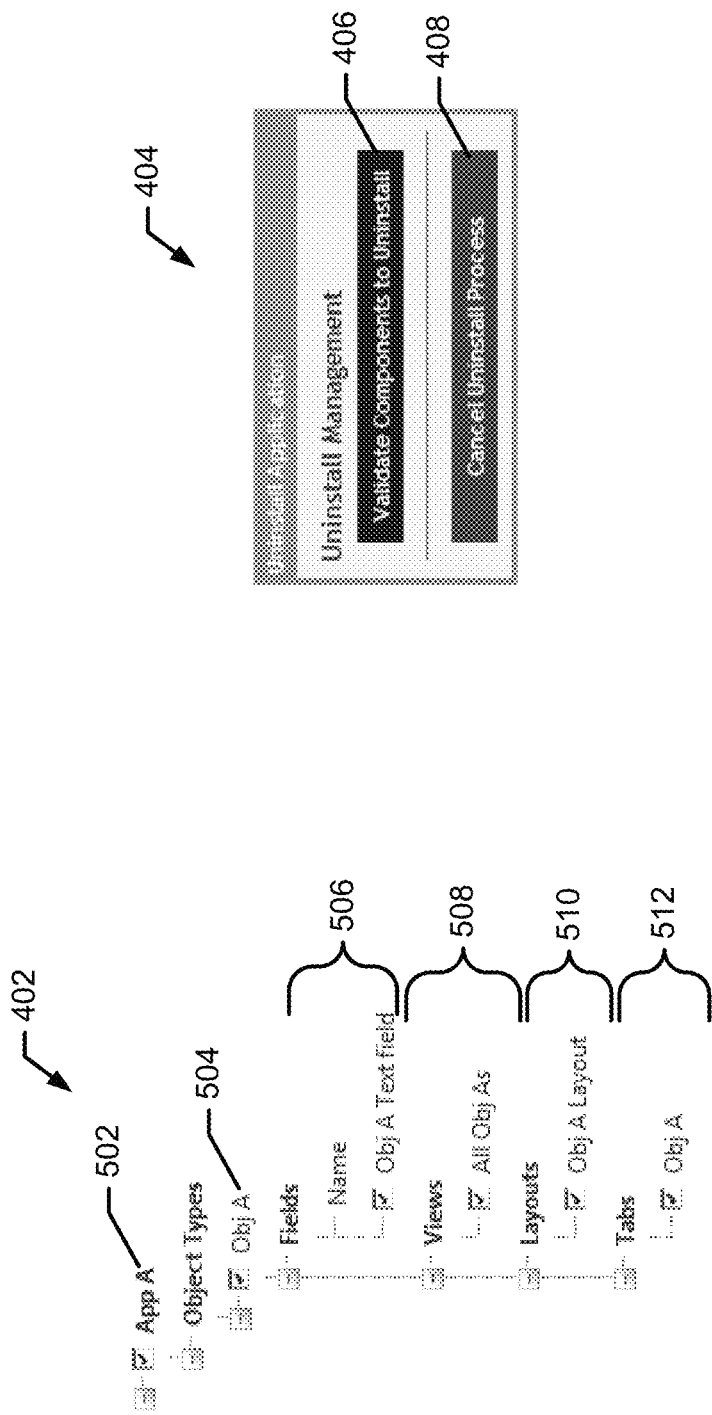

METHODS AND APPARATUS FOR UNINSTALLING A SOFTWARE APPLICATION

The present disclosure relates in general to databases, and, in particular, to methods and apparatus for uninstalling a software application.

BACKGROUND

Software applications typically include a plurality of software objects. Often, two or more software applications will share one or more software objects. Current methods of removing applications are inefficient and error-prone. In one method, an application and all of the objects associated with it are simply deleted from the environment without regard for any other applications that might be associated with the same underlying objects. Any applications that reference the deleted application or objects must also be deleted and then reinstalled.

In another method, a user must painstakingly select each object to be deleted, and can only be sure that his selections are correct through a time-consuming process of trial and error. Further, once the appropriate objects have been identified, deleting them on the back-end may not completely remove the application from the workspace. This inability to efficiently and effectively delete applications can clutter the workspace, contribute to system instability, and complicate the debugging process.

BRIEF DESCRIPTION OF THE DRAWINGS

FIG. 5 is an enlarged view of the application tree of FIG. 4.

FIG. 6 is an enlarged view of uninstall command buttons of FIG. 4.

DETAILED DESCRIPTION OF THE PREFERRED EMBODIMENTS

Briefly, methods and apparatus for uninstalling an application are disclosed. When a user selects an application to be uninstalled, a database is queried to determine a plurality of software objects that are associated with the selected application. The system then displays a plurality of relationships between the plurality of software objects (e.g., a tree view with check boxes to select and unselect objects). The display indicates which software objects in the plurality of software objects can be deleted without affecting other software objects in the plurality of software objects. In addition, the display indicates which software objects in the plurality of software objects cannot be deleted without affecting other software objects in the plurality of software objects. Based on these results, the user then determines a new list of objects to keep and objects to delete. This process is repeated until the user approves the list and deletes the application.

Figure 1:
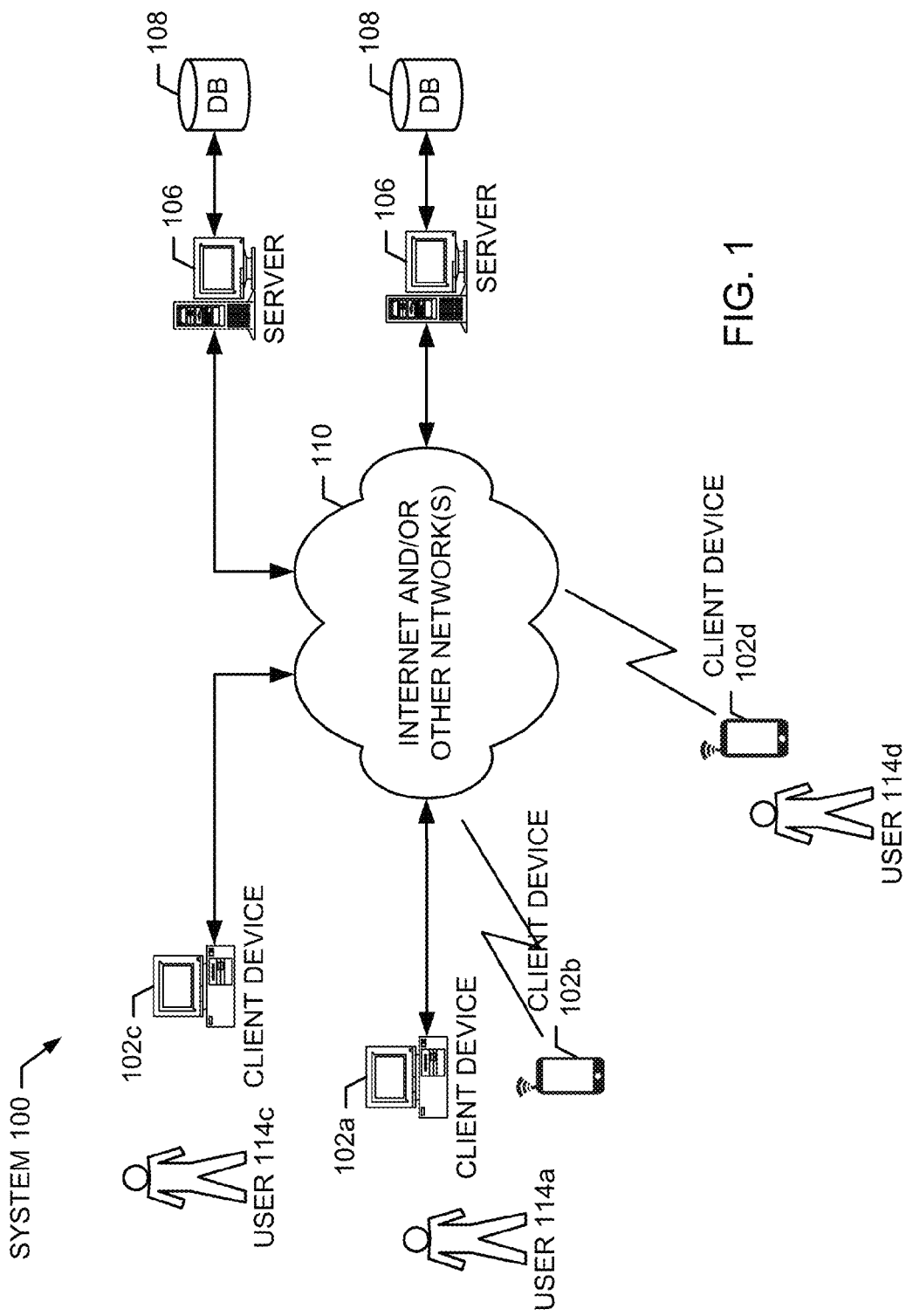
FIG. 1 is a block diagram of an example network communication system.

Turning now to the figures, the present system is most readily realized in a network communication system 100. A block diagram of certain elements of an example network communications system 100 is illustrated in FIG. 1. The illustrated system 100 includes one or more client devices 102 (e.g., computer, television, camera, phone), one or more web servers 106, and one or more databases 108. Each of these devices may communicate with each other via a connection to one or more communications channels 110 such as the Internet or some other wired and/or wireless data network, including, but not limited to, any suitable wide area network or local area network. It will be appreciated that any of the devices described herein may be directly connected to each other instead of over a network.

The web server 106 stores a plurality of files, programs, and/or web pages in one or more databases 108 for use by the client devices 102 as described in detail below. The database 108 may be connected directly to the web server 106 and/or via one or more network connections. The database 108 stores data as described in detail below.

One web server 106 may interact with a large number of client devices 102. Accordingly, each server 106 is typically a high end computer with a large storage capacity, one or more fast microprocessors, and one or more high speed network connections. Conversely, relative to a typical server 106, each client device 102 typically includes less storage capacity, a single microprocessor, and a single network connection.

In this example, user 114a is using client device 102a and client device 102b. For example, user 114a may be reviewing documents displayed on a desktop display of client device 102a and coding those documents using a touch screen on client device 102b.

Figure 2:
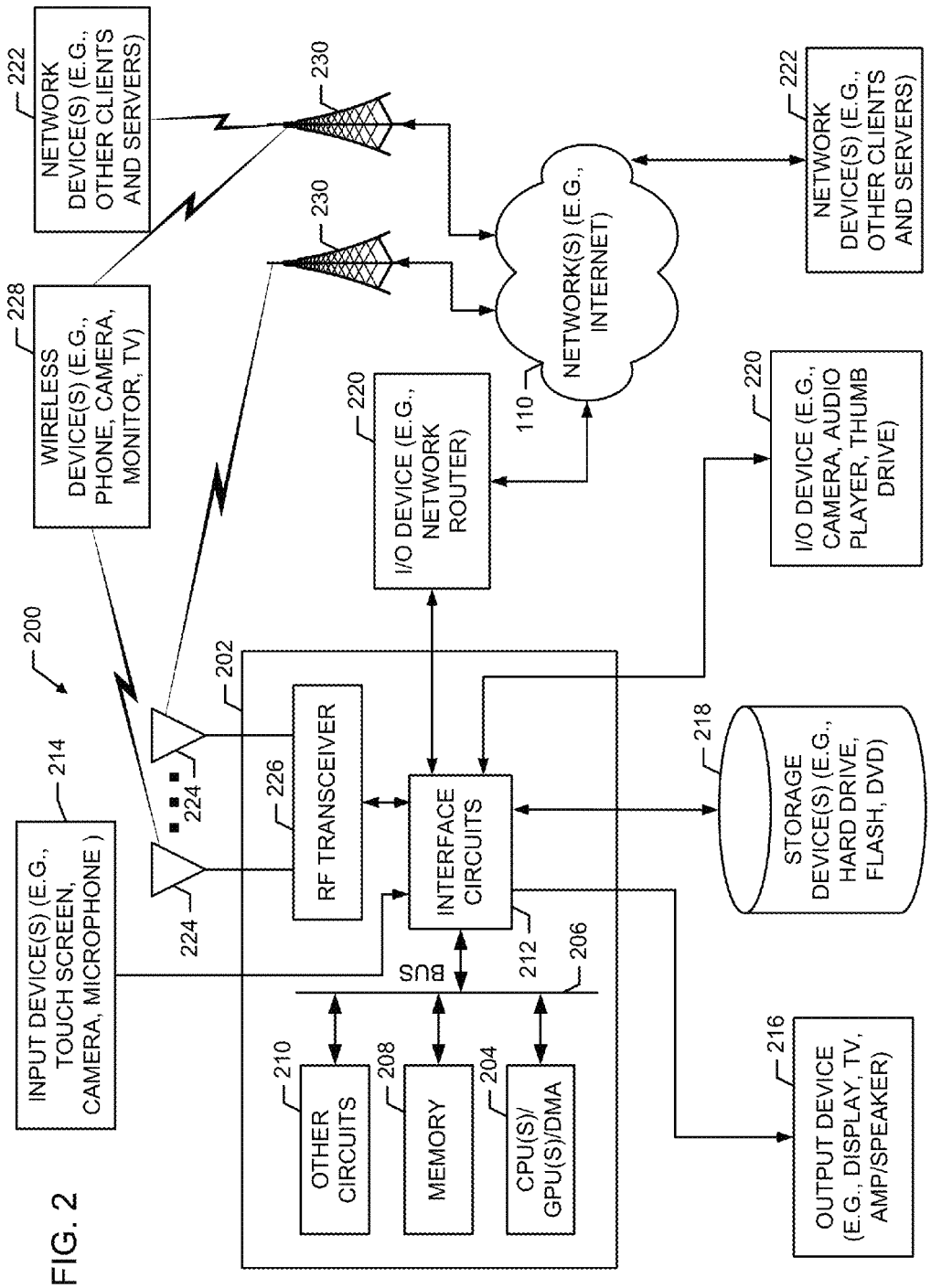
FIG. 2 is a block diagram of an example computing device.

Each of the devices illustrated in FIG. 1 (e.g., clients 102 and/or servers 106) may include certain common aspects of many computing devices such as microprocessors, memories, input devices, output devices, etc. FIG. 2 is a block diagram of an example computing device. The example computing device 200 includes a main unit 202 which may include, if desired, one or more processing units 204 electrically coupled by an address/data bus 206 to one or more memories 208, other computer circuitry 210, and one or more interface circuits 212. The processing unit 204 may include any suitable processor or plurality of processors. In addition, the processing unit 204 may include other components that support the one or more processors. For example, the processing unit 204 may include a central processing unit (CPU), a graphics processing unit (GPU), and/or a direct memory access (DMA) unit.

The memory 208 may include various types of non-transitory memory including volatile memory and/or non-volatile memory such as, but not limited to, distributed memory, read-only memory (ROM), random access memory (RAM) etc. The memory 208 typically stores a software program that interacts with the other devices in the system as described herein. This program may be executed by the processing unit 204 in any suitable manner. The memory 208 may also store digital data indicative of documents, files, programs, web pages, etc. retrieved from a server and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202.

For example, the input device 214 may be a keyboard, mouse, touch screen, track pad, camera, voice recognition system, accelerometer, global positioning system (GPS), and/or any other suitable input device.

One or more displays, printers, speakers, monitors, televisions, high definition televisions, and/or other suitable output devices 216 may also be connected to the main unit 202 via the interface circuit 212. One or more storage devices 218 may also be connected to the main unit 202 via the interface circuit 212. For example, a hard drive, CD drive, DVD drive, and/or other storage devices may be connected to the main unit 202. The storage devices 218 may store any type of data used by the device 200. The computing device 200 may also exchange data with one or more input/output (I/O) devices 220, such as network routers, camera, audio players, thumb drives etc.

The computing device 200 may also exchange data with other network devices 222 via a connection to a network 110. The network connection may be any type of network connection, such as an Ethernet connection, digital subscriber line (DSL), telephone line, coaxial cable, wireless base station 230, etc. Users 114 of the system 100 may be required to register with a server 106. In such an instance, each user 114 may choose a user identifier (e.g., e-mail address) and a password which may be required for the activation of services. The user identifier and password may be passed across the network 110 using encryption built into the user's browser. Alternatively, the user identifier and/or password may be assigned by the server 106.

In some embodiments, the device 200 may be a wireless device 200. In such an instance, the device 200 may include one or more antennas 224 connected to one or more radio frequency (RF) transceivers 226. The transceiver 226 may include one or more receivers and one or more transmitters operating on the same and/or different frequencies. For example, the device 200 may include a blue tooth transceiver 216, a Wi-Fi transceiver 216, and diversity cellular transceivers 216. The transceiver 226 allows the device 200 to exchange signals, such as voice, video and any other suitable data, with other wireless devices 228, such as a phone, camera, monitor, television, and/or high definition television. For example, the device 200 may send and receive wireless telephone signals, text messages, audio signals and/or video signals directly and/or via a base station 230.

Figure 3:
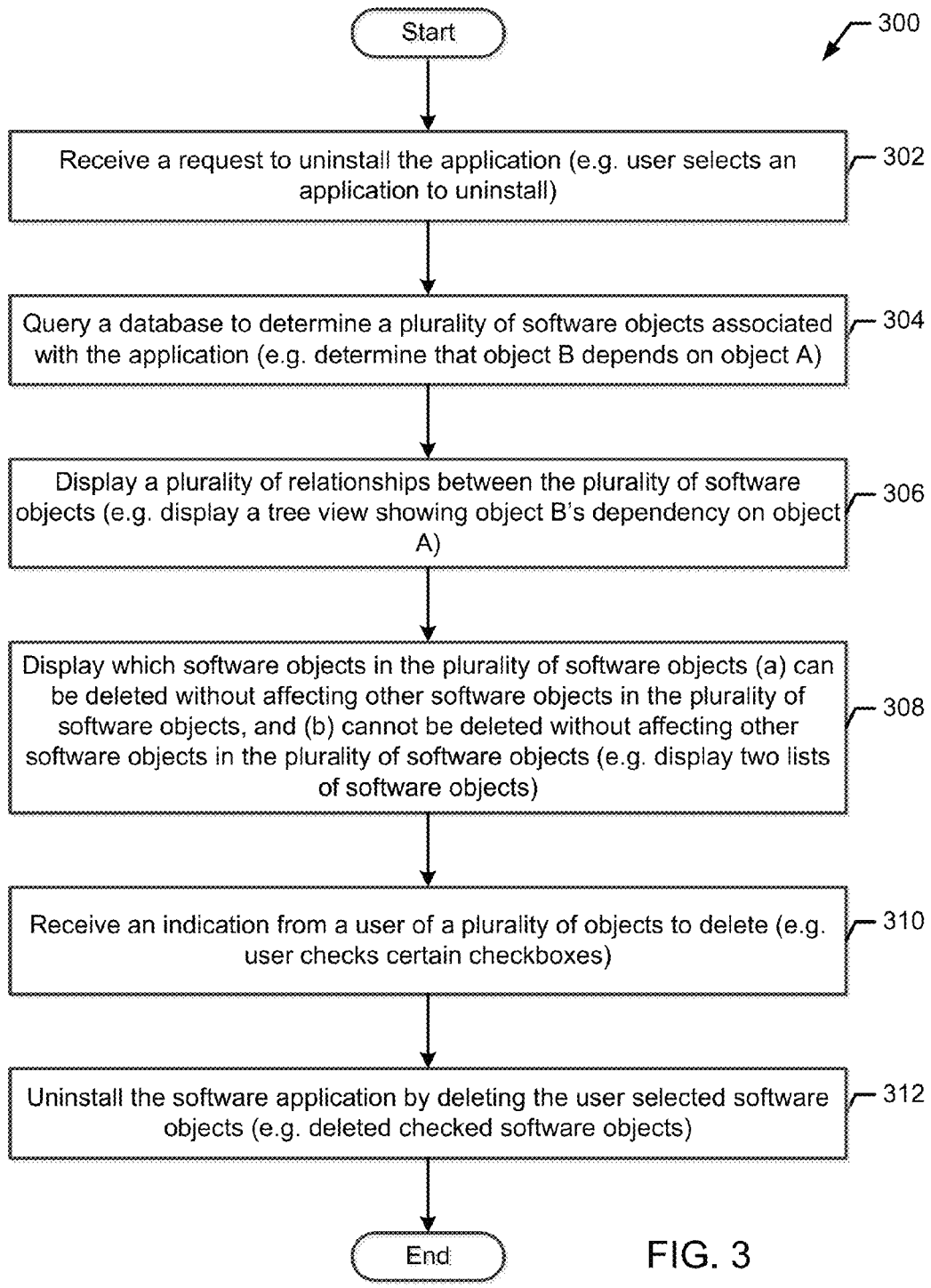
FIG. 3 is a flowchart of an example process for uninstalling a software application.

FIG. 3 is a flowchart of an example process for uninstalling a software application. The process 300 may be carried out by one or more suitably programmed processors, such as a CPU executing software (e.g., block 204 of FIG. 2). The process 300 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 300 is described with reference to the flowchart illustrated in FIG. 3, it will be appreciated that many other methods of performing the acts associated with process 300 may be used. For example, the order of many of the operations may be changed, and some of the operations described may be optional.

In this example, the process 300 begins when a request to uninstall an application is received (block 302). For example, a user may select an application to uninstall. Subsequently, a database is queried to determine a plurality of software objects that are associated with the selected application (block 304). For example, the system may determine that object B depends on object A.

The system then displays a plurality of relationships between the plurality of software objects (block 306). For example, a tree view showing object B's dependency on object A may be displayed. The display indicates which software objects in the plurality of software objects can be deleted without affecting other software objects in the plurality of software objects (block 308). In addition, the display indicates which software objects in the plurality of software objects cannot be deleted without affecting other software objects in the plurality of software objects (block 308). For example, two lists of software objects may be displayed. The display may also indicate which software objects in the plurality of software objects will be automatically deleted.

The user then indicates which of a plurality of objects to delete (block 310). For example, the user may check certain checkboxes. The software application is then uninstalled by deleting the user selected software objects (block 312). For example, all of the checked software objects are deleted.

Figure 4:
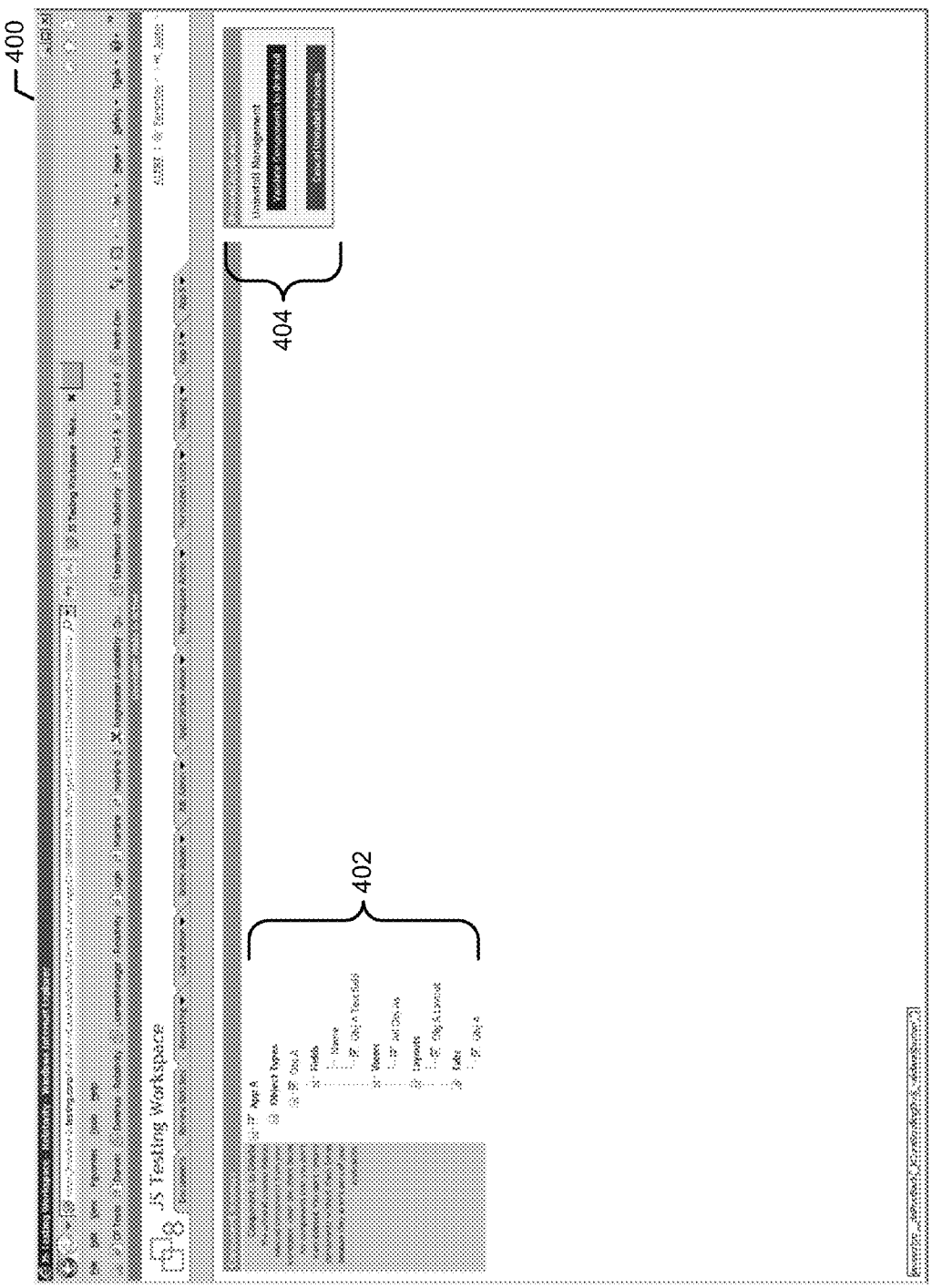
FIG. 4 is a screenshot of an example uninstall application.

FIG. 4 is a screenshot of an example uninstall application 400. In this example, the uninstall application 400 includes an application tree 402 and uninstall command buttons 404. FIG. 5 is an enlarged view of the application tree 402 of FIG. 4. In this example, application A 502 includes object A 504, which includes various fields 506, views 508, layouts 510, and tabs 512. FIG. 6 is an enlarged view of uninstall command buttons 404 of FIG. 4. In this example, the uninstall command buttons 404 include a validate button 406 and a cancel button 408.

Figure 7:
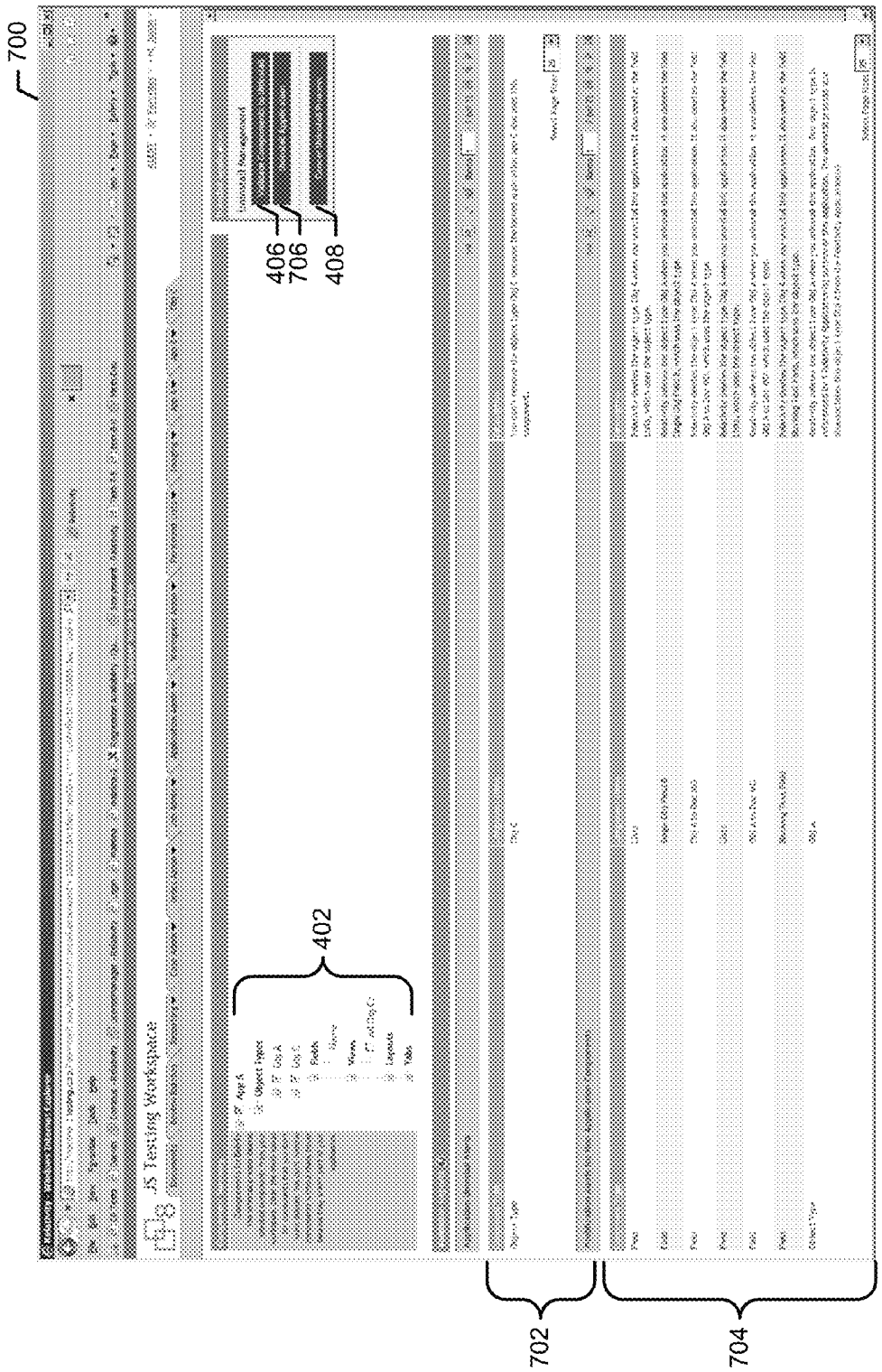
FIG. 7 is another screenshot of the example uninstall application of FIG. 4 after a validation cycle has been executed.
Figure 8:
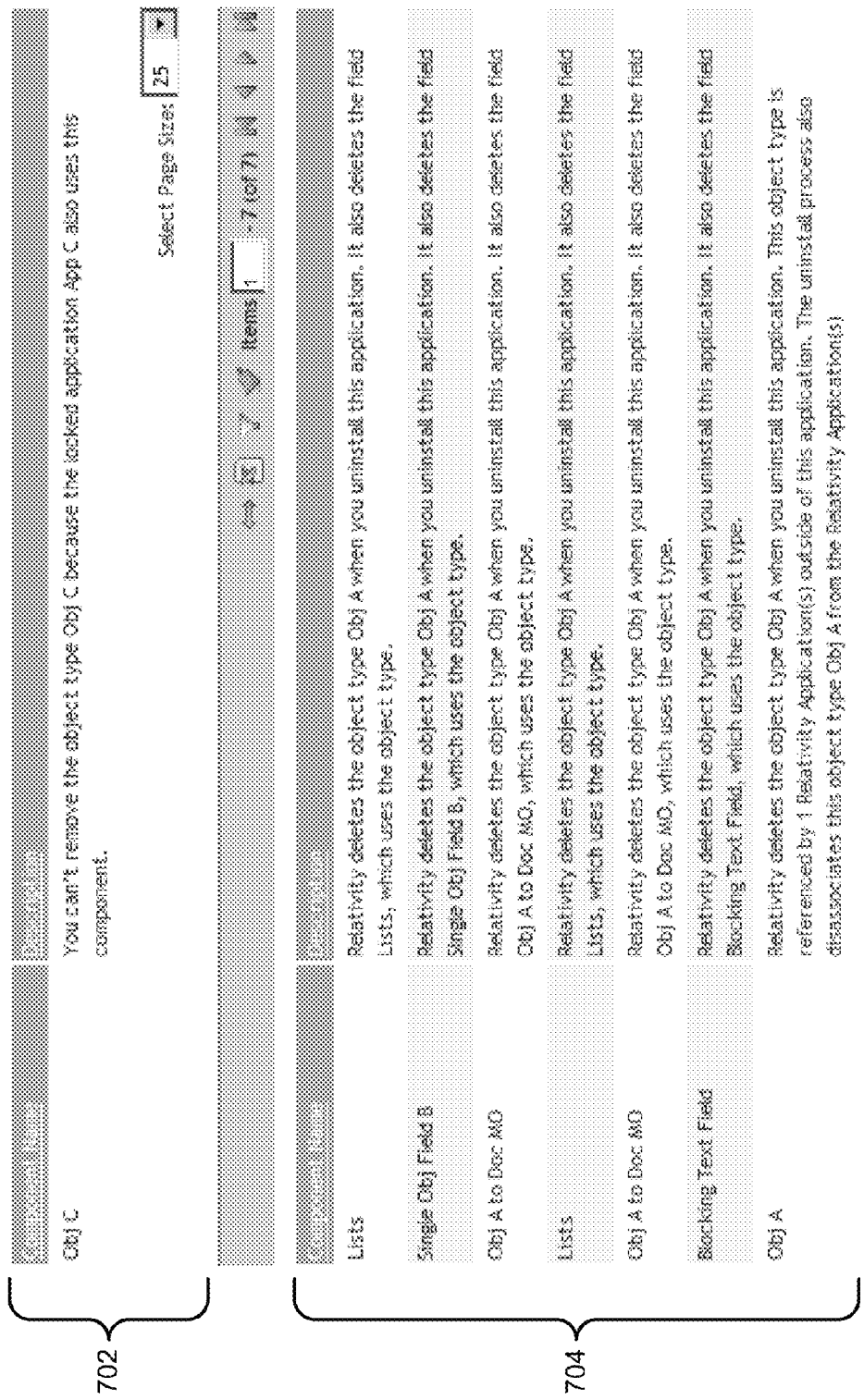
FIG. 8 is an enlarged view of the locked report and the unlocked report of the screenshot of FIG. 7.

FIG. 7 is another screenshot of the example uninstall application of FIG. 4 after a validation cycle has been executed. In this example, a user has pressed the validate button 406 and the system has generated a locked report 702 and an unlocked report 704. In addition, an uninstall button 706 has been added to the uninstall command buttons 404. FIG. 8 is an enlarged view of the locked report 702 and the unlocked report 704 of the screenshot of FIG. 7. In this example, object C cannot be removed because it is locked by application C. Accordingly, the user may uncheck object C in the application tree 402 and rerun the report by pressing the validate button 406. Pressing the uninstall button 706 will delete the objects that remain checked in the application tree 402.

In summary, persons of ordinary skill in the art will readily appreciate that methods and apparatus for uninstalling a software application have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of uninstalling a software application, the method comprising:
   receiving a request to uninstall the software application;
   querying a database to determine a plurality of software objects associated with the software application, each of the plurality of software objects being associated with a respective set of one or more object fields;
   displaying, via a relationship view, a plurality of relationships among the plurality of software objects and the respective sets of object fields, wherein the relationship view includes user-selectable controls associated with (i) at least one software object of the plurality of software objects and (ii) at least one object field of the respective sets of object fields;

displaying which software objects in the plurality of software objects cannot be deleted without affecting one or both of (i) one or more other software objects in the plurality of software objects and (ii) one or more other software applications;

receiving an indication, made by a user via one or more of the user-selectable controls, of a plurality of user-selected components to delete, the plurality of user-selected components including one or both of (i) one or more software objects of the plurality of software objects, and (ii) one or more object fields of the respective sets of object fields; and uninstalling the software application by deleting the plurality of user-selected components.

2. The method of claim 1, wherein the steps of displaying which software objects cannot be deleted, and receiving an indication made by the user of a plurality of user-selected components to delete, are repeated a plurality of times before uninstalling the software application.

3. The method of claim 1, wherein displaying which software objects cannot be deleted includes displaying which other software objects depend on the software objects that cannot be deleted.

4. The method of claim 3, wherein displaying which other software objects depend on the software objects that cannot be deleted includes graphically displaying which other software objects depend on the software objects that cannot be deleted.

5. The method of claim 1, including displaying which software objects in the plurality of software objects will be automatically deleted.

6. The method of claim 1, wherein displaying which software objects cannot be deleted includes displaying which software objects cannot be deleted without affecting the one or more other software objects in the plurality of software objects.

7. The method of claim 1, wherein displaying which software objects cannot be deleted includes displaying which software objects cannot be deleted without affecting the one or more other software applications.

8. An apparatus for building a search index for a database, the apparatus comprising:
 a processor;
 a network interface operatively coupled to the processor; and
 a memory device operatively coupled to the processor, the memory device storing instructions to cause the processor to:
  receive a request to uninstall a software application;
  query a database to determine a plurality of software objects associated with the software application, each of the plurality of software objects being associated with a respective set of one or more object fields;
  display, via a relationship view, a plurality of relationships among the plurality of software objects and the respective sets of object fields, wherein the relationship view includes user-selectable controls associated with (i) at least one software object of the plurality of software objects and (ii) at least one object field of the respective sets of object fields;
  display which software objects in the plurality of software objects cannot be deleted without affecting one or both of (i) one or more other software objects in the plurality of software objects and (ii) one or more other software applications;
  receive an indication, made by a user via one or more of the user-selectable controls, of a plurality of user-selected components to delete, the plurality of user-selected components including one or both of (i) one or more software objects of the plurality of software objects, and (ii) one or more object fields of the respective sets of object fields; and
  uninstall the software application by deleting the plurality of user-selected components.

9. The apparatus of claim 8, wherein the instructions are structured to cause the processor to display which software objects cannot be deleted, and receive an indication made by the user of a plurality of user-selected components to delete, a plurality of times before uninstalling the software application.

10. The apparatus of claim 8, wherein the instructions are structured to cause the processor to display which other software objects depend on the software objects that cannot be deleted.

11. The apparatus of claim 10, wherein the instructions are structured to cause the processor to graphically display which other software objects depend on the software objects that cannot be deleted.

12. The apparatus of claim 8, wherein the instructions are structured to cause the processor to display which software objects in the plurality of software objects will be automatically deleted.

13. The apparatus of claim 8, wherein the instructions are structured to cause the processor to display which software objects in the plurality of software objects cannot be deleted without affecting the one or more other software objects in the plurality of software objects.

14. The apparatus of claim 8, wherein the instructions are structured to cause the processor to display which software objects in the plurality of software objects cannot be deleted without affecting the one or more other software applications.

15. A non-transitory computer readable medium storing instructions structured to cause a computing device to:
 receive a request to uninstall a software application;
 query a database to determine a plurality of software objects associated with the software application, each of the plurality of software objects being associated with a respective set of one or more object fields;
 display, via a relationship view, a plurality of relationships among the plurality of software objects and the respective sets of object fields, wherein the relationship view includes user-selectable controls associated with (i) at least one software object of the plurality of software objects and (ii) at least one object field of the respective sets of object fields;
 display which software objects in the plurality of software objects cannot be deleted without affecting one or both of (i) one or more other software objects in the plurality of software objects and (ii) one or more other software applications;
 receive an indication, made by a user via one or more of the user-selectable controls, of a plurality of user-selected components to delete, the plurality of user-selected components including one or both of (i) one or more software objects of the plurality of software objects, and (ii) one or more object fields of the respective sets of object fields; and
 uninstall the software application by deleting the plurality of user-selected components.

16. The computer readable medium of claim 15, wherein the instructions are structured to cause the processor to display which software objects cannot be deleted, and receive an indication made by the user of a plurality of user-selected components to delete, a plurality of times before uninstalling the software application.

17. The computer readable medium of claim 15, wherein the instructions are structured to cause the processor to display which other software objects depend on the software objects that cannot be deleted.

18. The computer readable medium of claim 17, wherein the instructions are structured to cause the processor to graphically display which other software objects depend on the software objects that cannot be deleted.

19. The computer readable medium of claim 15, wherein the instructions are structured to cause the processor to display which software objects in the plurality of software objects will be automatically deleted.

20. The computer readable medium of claim 15, wherein the instructions are structured to cause the processor to display which software objects in the plurality of software objects cannot be deleted without affecting the one or more other software applications.

* * * * *